(12) United States Patent
Caveney et al.

(10) Patent No.: US 7,811,119 B2
(45) Date of Patent: Oct. 12, 2010

(54) SMART CABLE PROVISIONING FOR A PATCH CORD MANAGEMENT SYSTEM

(75) Inventors: Jack E. Caveney, Hinsdale, IL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/560,112

(22) Filed: Nov. 15, 2006

(65) Prior Publication Data
US 2007/0117444 A1    May 24, 2007

Related U.S. Application Data (60) Provisional application No. 60/765,907, filed on Feb. 7, 2006, provisional application No. 60/737,919, filed on Nov. 18, 2005.

(51) Int. Cl.
*H01R 3/00* (2006.01)
(52) U.S. Cl. ...................................... 439/489
(58) Field of Classification Search ............... 439/489, 439/490, 676, 488, 491; 340/686.1, 310.11, 340/568.2, 540, 816, 539, 505, 651, 825; 702/183; 385/135; 324/66, 67
See application file for complete search history.

(56) References Cited

U.S. PATENT DOCUMENTS

| | | |
|---|---|---|
| 3,052,842 A | 9/1962 | Frohman et al. |
| 3,573,789 A | 4/1971 | Sharp et al. |
| 3,573,792 A | 4/1971 | Reed et al. |
| 3,914,561 A | 10/1975 | Schardt et al. |
| 4,018,997 A | 4/1977 | Hoover et al. |

(Continued)

FOREIGN PATENT DOCUMENTS

EP    0297079    3/1992

(Continued)

OTHER PUBLICATIONS

"Finding the Missing Link," Cabling Installation & Maintenance, Jun./Jul. 2002.

(Continued)

*Primary Examiner*—Alexander Gilman
(74) *Attorney, Agent, or Firm*—Robert A. McCann; Zachary J. Smolinski; Christopher K. Marlow (57) ABSTRACT

A network documentation and revision system is presented that includes first and second devices connected by a patch cord. The first device has provisioning and signal ports with corresponding contact assemblies. The second device has a switch port without a contact assembly. The patch cord has signal and control wires, a first connector that connects the signal wires into a signal port and the control wire to a corresponding contact assembly, and a second connector that connects the signal wires to the switch port and terminates the control wire. The second connector contains an indicator controlled by control circuitry, detection circuitry detecting whether the second connector is plugged into the second device, and ID circuitry providing an ID number through the first connector. Installation or removal of the patch cord is guided by indicators on the patch cord and first device without retrofit contacts being added to the second device.

18 Claims, 10 Drawing Sheets

U.S. PATENT DOCUMENTS

| | | | |
|---|---|---|---|
| 4,072,827 A | 2/1978 | Oman | |
| 4,096,359 A | 6/1978 | Barsellotti | |
| 4,140,885 A | 2/1979 | Verhagen | |
| 4,169,220 A * | 9/1979 | Fields | 379/27.07 |
| 4,196,316 A | 4/1980 | McEowen et al. | |
| 4,517,619 A | 5/1985 | Uekubo | |
| 4,673,246 A | 6/1987 | Schembri | |
| 4,773,867 A | 9/1988 | Keller et al. | |
| 4,796,294 A | 1/1989 | Nakagawara | |
| 4,869,566 A | 9/1989 | Juso et al. | |
| 4,890,102 A | 12/1989 | Oliver | |
| 4,901,004 A | 2/1990 | King | |
| 4,937,529 A | 6/1990 | O'Toole, III et al. | |
| 4,937,835 A | 6/1990 | Ballard et al. | |
| 5,037,167 A | 8/1991 | Beaty | |
| 5,081,627 A | 1/1992 | Yu | |
| 5,107,532 A | 4/1992 | Hansen et al. | |
| 5,111,408 A | 5/1992 | Amjadi | |
| 5,145,380 A | 9/1992 | Holcomb et al. | |
| 5,161,988 A | 11/1992 | Krupka | |
| 5,170,327 A | 12/1992 | Burroughs | |
| 5,204,929 A | 4/1993 | Machall et al. | |
| 5,222,164 A | 6/1993 | Bass, Sr. et al. | |
| 5,226,120 A | 7/1993 | Brown et al. | |
| 5,233,501 A | 8/1993 | Allen et al. | |
| 5,265,187 A | 11/1993 | Morin et al. | |
| 5,270,658 A | 12/1993 | Epstein | |
| 5,305,405 A | 4/1994 | Emmons et al. | |
| 5,353,367 A | 10/1994 | Czosnowski et al. | |
| 5,375,028 A * | 12/1994 | Fukunaga | 361/93.7 |
| 5,394,503 A | 2/1995 | Dietz, Jr. et al. | |
| 5,432,847 A | 7/1995 | Hill et al. | |
| 5,459,478 A * | 10/1995 | Bolger et al. | 345/46 |
| 5,463,706 A | 10/1995 | Dumont et al. | |
| 5,483,467 A | 1/1996 | Krupka et al. | |
| 5,487,666 A | 1/1996 | DiGiovanni | |
| 5,521,902 A | 5/1996 | Ferguson | |
| 5,532,603 A | 7/1996 | Bottman | |
| 5,546,282 A | 8/1996 | Hill et al. | |
| 5,550,755 A | 8/1996 | Martin et al. | |
| 5,583,874 A | 12/1996 | Smith et al. | |
| 5,666,453 A | 9/1997 | Dannenmann | |
| 5,684,796 A | 11/1997 | Abidi et al. | |
| 5,726,972 A | 3/1998 | Ferguson | |
| 5,727,055 A | 3/1998 | Ivie et al. | |
| 5,754,112 A | 5/1998 | Novak | |
| 5,764,043 A | 6/1998 | Czosnowski et al. | |
| 5,790,041 A | 8/1998 | Lee | |
| 5,832,071 A | 11/1998 | Voelker | |
| 5,847,557 A | 12/1998 | Fincher et al. | |
| 5,854,824 A | 12/1998 | Bengal et al. | |
| 5,870,626 A | 2/1999 | Lebeau | |
| 5,876,240 A | 3/1999 | Derstine et al. | |
| 5,878,030 A | 3/1999 | Norris | |
| 5,892,756 A | 4/1999 | Murphy | |
| 5,898,837 A | 4/1999 | Guttman et al. | |
| 5,915,993 A | 6/1999 | Belopolsky et al. | |
| 5,923,663 A | 7/1999 | Bontemps et al. | |
| 5,944,535 A | 8/1999 | Bullivant et al. | |
| 6,002,331 A * | 12/1999 | Laor | 340/539.1 |
| 6,041,352 A | 3/2000 | Burdick et al. | |
| 6,067,014 A | 5/2000 | Wilson | |
| 6,078,113 A | 6/2000 | True et al. | |
| 6,086,415 A | 7/2000 | Sanchez et al. | |
| 6,094,261 A | 7/2000 | Contarino, Jr. | |
| 6,168,555 B1 * | 1/2001 | Fetterleigh et al. | 482/77 |
| 6,175,865 B1 | 1/2001 | Dove et al. | |
| 6,222,908 B1 | 4/2001 | Bartolutti et al. | |
| 6,229,538 B1 | 5/2001 | McIntyre et al. | |
| 6,234,830 B1 | 5/2001 | Ensz et al. | |
| 6,243,510 B1 | 6/2001 | Rauch | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,381,283 B1 | 4/2002 | Bhardwaj et al. | |
| 6,421,322 B1 * | 7/2002 | Koziy et al. | 370/248 |
| 6,424,710 B1 | 7/2002 | Bartolutti et al. | |
| 6,434,716 B1 | 8/2002 | Johnson et al. | |
| 6,437,894 B1 | 8/2002 | Gilbert et al. | |
| 6,453,014 B1 | 9/2002 | Jacobson et al. | |
| 6,456,768 B1 | 9/2002 | Boncek et al. | |
| 6,499,861 B1 | 12/2002 | German et al. | |
| 6,522,737 B1 | 2/2003 | Bartolutti et al. | |
| 6,543,941 B1 | 4/2003 | Lampert | |
| 6,561,827 B2 | 5/2003 | Frostrom et al. | |
| 6,577,243 B1 * | 6/2003 | Dannenmann et al. | 340/815.45 |
| 6,588,938 B1 | 7/2003 | Lampert et al. | |
| 6,601,097 B1 | 7/2003 | Cheston et al. | |
| 6,626,697 B1 | 9/2003 | Martin et al. | |
| 6,629,269 B1 | 9/2003 | Kahkoska | |
| 6,684,179 B1 | 1/2004 | David | |
| 6,688,910 B1 | 2/2004 | Macauley | |
| 6,714,698 B2 | 3/2004 | Pfeiffer et al. | |
| 6,725,177 B2 | 4/2004 | David et al. | |
| 6,750,643 B2 | 6/2004 | Hwang et al. | |
| 6,778,911 B2 | 8/2004 | Opsal et al. | |
| 6,784,802 B1 | 8/2004 | Stanescu | |
| 6,798,944 B2 | 9/2004 | Pfeiffer et al. | |
| 6,802,735 B2 | 10/2004 | Pepe et al. | |
| 6,823,063 B2 | 11/2004 | Mendoza | |
| 6,857,897 B2 | 2/2005 | Conn | |
| 6,871,156 B2 | 3/2005 | Wallace et al. | |
| 6,894,480 B2 * | 5/2005 | Back | 324/158.1 |
| 6,898,368 B2 | 5/2005 | Colombo et al. | |
| 6,905,363 B2 | 6/2005 | Musolf et al. | |
| 6,906,505 B2 | 6/2005 | Brunet et al. | |
| 6,975,242 B2 | 12/2005 | Dannenmann et al. | |
| 6,992,491 B1 | 1/2006 | Lo et al. | |
| 7,005,861 B1 | 2/2006 | Lo et al. | |
| 7,027,704 B2 | 4/2006 | Frohlich et al. | |
| 7,028,087 B2 | 4/2006 | Caveney | |
| 7,029,137 B2 | 4/2006 | Lionetti et al. | |
| 7,038,135 B1 | 5/2006 | Chan et al. | |
| 7,049,937 B1 * | 5/2006 | Zweig et al. | 340/310.11 |
| 7,068,043 B1 | 6/2006 | Lo et al. | |
| 7,068,044 B1 | 6/2006 | Lo et al. | |
| 7,160,143 B2 * | 1/2007 | David et al. | 439/489 |
| 7,207,846 B2 | 4/2007 | Caveney et al. | |
| 7,234,944 B2 * | 6/2007 | Nordin et al. | 439/49 |
| 6,574,586 B1 | 1/2008 | David et al. | |
| 2002/0069277 A1 | 6/2002 | Caveney | |
| 2002/0071394 A1 | 6/2002 | Koziy et al. | |
| 2002/0090858 A1 * | 7/2002 | Caveney | 439/490 |
| 2002/0116485 A1 | 8/2002 | Black et al. | |
| 2003/0061393 A1 * | 3/2003 | Steegmans et al. | 709/250 |
| 2003/0073343 A1 | 4/2003 | Belesimo | |
| 2003/0152087 A1 | 8/2003 | Shahoumian et al. | |
| 2004/0044599 A1 * | 3/2004 | Kepner et al. | 705/30 |
| 2004/0052471 A1 | 3/2004 | Colombo et al. | |
| 2004/0065470 A1 | 4/2004 | Goodison et al. | |
| 2004/0073597 A1 | 4/2004 | Caveney et al. | |
| 2004/0077220 A1 | 4/2004 | Musolf et al. | |
| 2004/0219827 A1 | 11/2004 | David et al. | |
| 2005/0052174 A1 | 3/2005 | Angelo et al. | |
| 2005/0111491 A1 | 5/2005 | Caveney | |
| 2005/0136729 A1 | 6/2005 | Redfield et al. | |
| 2005/0141431 A1 | 6/2005 | Caveney et al. | |
| 2005/0186819 A1 | 8/2005 | Velleca et al. | |
| 2005/0195584 A1 | 8/2005 | AbuGhazaleh et al. | |
| 2005/0224585 A1 | 10/2005 | Durrant et al. | |
| 2005/0231325 A1 | 10/2005 | Durrant et al. | |
| 2005/0239339 A1 | 10/2005 | Pepe | |
| 2005/0245127 A1 | 11/2005 | Nordin et al. | |
| 2006/0047800 A1 | 3/2006 | Caveney et al. | |

| | | | |
|---|---|---|---|
| 2006/0057876 | A1 | 3/2006 | Dannenmann et al. |
| 2006/0282529 | A1 | 12/2006 | Nordin |
| 2007/0032124 | A1 | 2/2007 | Nordin et al. |
| 2007/0132503 | A1 | 6/2007 | Nordin |

FOREIGN PATENT DOCUMENTS

| | | |
|---|---|---|
| EP | 0575100 | 4/1998 |
| EP | 0745229 | 3/2003 |
| FR | 2680067 A1 | 8/1991 |
| GB | 2236398 | 4/1991 |
| GB | 2236398 A | 4/1991 |
| GB | 2347751 A | 9/2000 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 2004044599 | 5/2004 |
| WO | 2005072156 | 8/2005 |
| WO | 2006052686 A1 | 5/2006 |

OTHER PUBLICATIONS

"IntelliMAC-The New Intelligent Cable Management Solution by ITRACS&NORDX/CDT," Press Release 2003.

"RiT Technologies Ltd. SMART Cabling System," RiT Technologies Ltd., 2004.

"Ortronics Launches iTRACS—Ready Structured Cabling Solutions," News Release Mar. 7, 2003.

"The SYSTIMAX iPatch System—Intelligent yet simple patching. . .", CommScope, Inc., 2004.

"White Paper—Intelligent Patching," David Wilson, Nov. 2002.

"PatchView for the Enterprise (PV4E) technical background/Networks for Business," Jun. 24-26, 2003.

"RiT Technologies Ltd. Go Patch-less," May 2000 Edition of Cabling Systems.

"Intelligent Cable Management Systems—Hot Topics—Trescray".

"Brand-Rex Network solutions Access racks Cat 5E6 cabling UK".

"Molex Premise Networks/Western Europe-Real Time Patching System," Molex Prem. Networks, 2001.

"Product of the Week—Molex's Real Time Patching System".

"EC&M Taking Note of Patch Panel Technology," Mark McElroy, Jun. 1, 1998.

"Intelligent Patching SMARTPatch for the Enterprise (SP4E)".

\* cited by examiner

SMART CABLE PROVISIONING FOR A PATCH CORD MANAGEMENT SYSTEM

RELATED APPLICATIONS

The present application claims the benefit of priority to U.S. Provisional Patent Application Ser. No. 60/737,919, filed Nov. 18, 2005, entitled "Smart Cable Provisioning in Interconnect Applications for a Patch Cord Management System" and U.S. Provisional Patent Application Ser. No. 60/765,907, filed Feb. 7, 2006, entitled "Smart Cable Provisioning for a Patch Cord Management System," both of which are incorporated herein by reference in their entirety. The present application also incorporates by reference in its entirety U.S. patent application Ser. No. 11/265,316, filed Nov. 2, 2005, entitled "Method and Apparatus for Patch Panel Patch Cord Documentation and Revision."

TECHNICAL FIELD

The present invention relates to network documentation and revision systems and more particularly relates to a system for using patch cables having identification information to enable the provision of cable installation and removal instructions to a network technician and further to provide accurate network monitoring documentation.

BACKGROUND

Patch panels are used in communications networks as intermediate elements between horizontal cabling (to which endpoint devices such as computers and telephones are connected) and network switches. When physical connections between endpoint devices and network switches are moved, added, or changed, patch panels are the points at which technicians complete the required moves, additions, or changes of cabling within patch fields. It is important to keep track of changes that are made to patch cord connections within the patch field. Proper documentation of changes in the patch field assures that the routing of patch cords is always known and further assures that any future changes are completed correctly.

In interconnect network configurations, one patch panel is placed between the horizontal cabling and the network switch. In an interconnect configuration, the documentation of patch cord connections between the patch panel and the switch will provide the necessary documentation and monitoring of connections between the switch and the horizontal cabling. It is desirable to have a patch cord management system that enables complete documentation and monitoring of patch cord connections and that guides network installers as they make moves, adds, or changes to the patch cord connections. It is also desirable for a patch cord management system to have a minimal impact on existing networks.

State-of-the-art patch cord documentation systems for interconnect applications require the addition of contact plates on printed circuit boards which are fastened to the front of switches and which have cables which connect the printed circuit boards to monitoring systems which scan $9^{th}$ wire connections between the switch contact plates and contact plates on the front of an associated patch panel. This is typically a retrofit installation which requires a great variety of parts due to the great variety of switch configurations.

The present invention is revolutionary because it works with any Ethernet switch without requiring any retrofit contacts. In addition, it monitors the patch cord configuration of a Network System in real time and provides immediate notice of any change.

SUMMARY OF THE INVENTION

According to one embodiment of the present invention, a patch cord management system supports patch cord management in communications networks having an interconnect configuration. In one embodiment, patch cord identification information is electronically provided within a smart patch cord. The patch cord identification information can be read electronically by an intelligent patch panel, and each patch cord that is plugged into an intelligent patch panel is uniquely identifiable by the intelligent patch panel. The patch cord identification information can be associated with a switch and switch port, along with other physical information related to a data communication room, in a database. The provisioning of a smart patch cord and the association of the smart patch cord with an Ethernet switch and switch port are preferably done automatically.

In one embodiment, indicator lights are provided to guide the installation and removal of patch cord connections. Indicator lights may be provided on patch cord plugs that are plugged into network switch ports. Indicator lights may also be provided near ports of an intelligent patch panel.

According to another embodiment of the present invention, a patch cord management system supports patch cord management in communications networks.

Patch cord management systems according to some embodiments of the present invention could be used in cross-connect networks.

BRIEF DESCRIPTION OF FIGURES

FIG. 1d is a voltage-to-time plot of request and response signaling according to one embodiment of the invention;

DETAILED DESCRIPTION OF PREFERRED EMBODIMENTS

Figure 1:
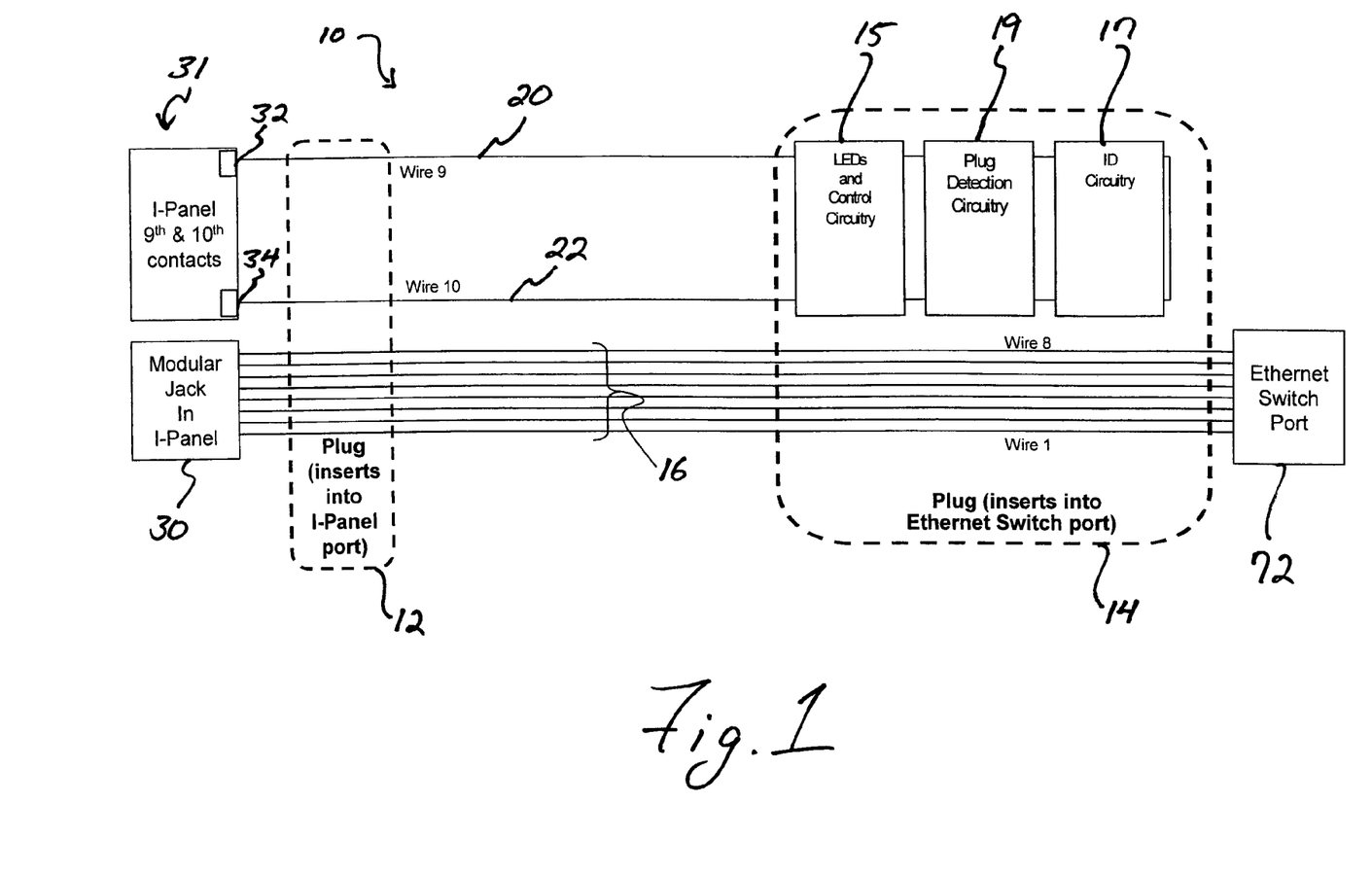
FIG. 1 is a block diagram of a smart patch cord according to one embodiment of the present invention.
Figure 2:
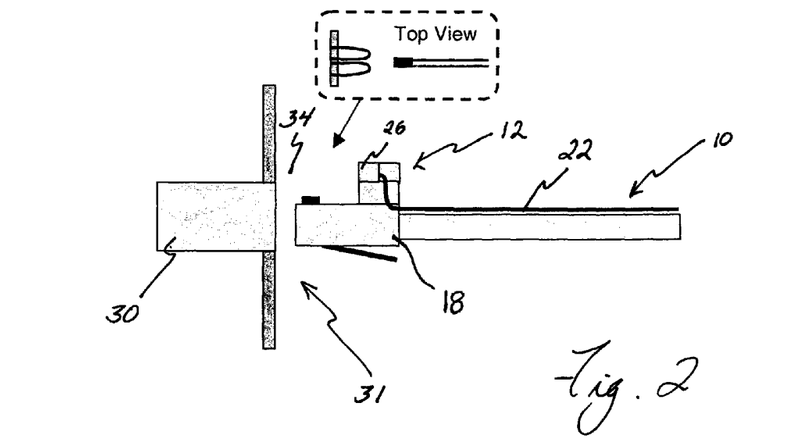
FIG. 2 is a side view of a plug of a smart patch cord being plugged into a jack of an intelligent patch panel.
Figure 3:
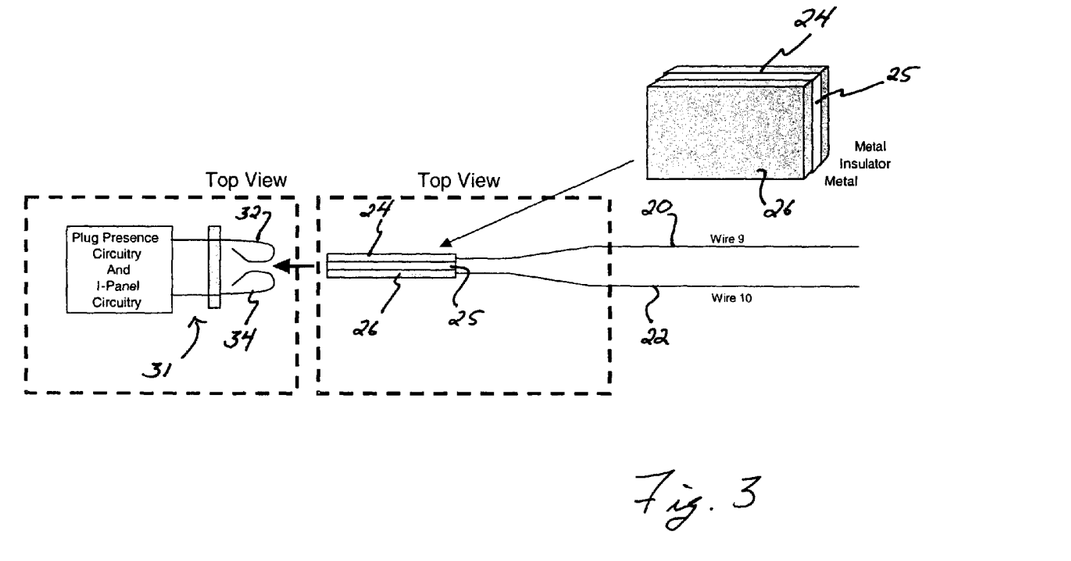
FIG. 3 shows the construction of contacts on a port of an intelligent patch panel and on a plug of a smart patch cord, including a perspective view of the contacts of the smart patch cord.
Figure 4:
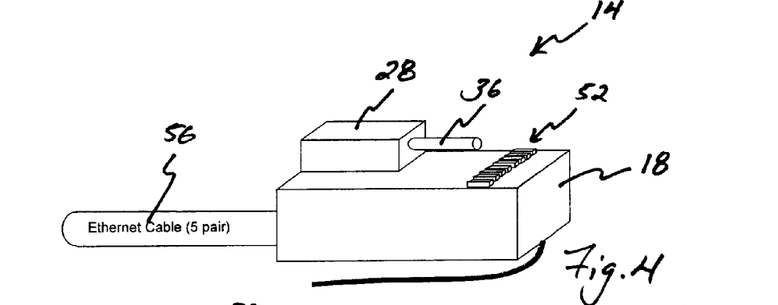
FIG. 4 is a perspective view of a plug of a smart patch cord for insertion into a port of a network switch.

The present invention is directed to methods and systems for monitoring, documenting, and guiding patch cord changes in a patch field of a communications network. The invention uses smart patch cords having unique identification information programmed into hardware within the smart patch cords. FIG. 1 is a block diagram showing a smart patch cord 10 according to one embodiment of the invention. The smart patch cord 10 has a patch panel plug 12 for insertion into a port 31 of an intelligent patch panel and a switch plug 14 for insertion into a network switch such as an Ethernet switch. In the embodiment shown in FIG. 1, the smart patch cord 10 includes ten wires. The first through eighth wires 16 are Ethernet communication wires and they terminate at RJ-45 plugs 18 (as shown in FIGS. 2 and 4) at the patch panel plug 12 and the switch plug 14 ends of the smart patch cord 10. The ninth wire 20 and the tenth wire 22 of the smart patch cord 10 have different terminations on their two ends. At the patch panel plug end, the ninth and tenth wires 20 and 22 terminate at first and second contact plates 24 and 26 (as shown in FIG. 3). At the network switch plug end, the ninth and tenth wires 20 and 22 terminate at a pogo switch assembly 28 provided within the network switch plug 14 of the smart patch cord 10. The port 31 of the intelligent patch panel may comprise a jack 30 and ninth and tenth contacts 32 and 34.

Turning now to FIG. 2, a side view of a patch panel plug 12 of a smart patch cord 10 being plugged into a modular jack 30 of an intelligent patch panel port 31 is shown. In the RJ-45 jack embodiment shown, the modular jack 30 contains eight contacts that are electrically connected to the first through eighth wires 16 of the smart patch cord 10. In addition, the first and second contact plates 24 and 26 of the patch panel plug 12 contact ninth and tenth contacts 32 and 34 associated with the intelligent patch panel port 31. FIG. 3 shows the first and second contact plates 24 and 26 of the patch panel plug 12 being inserted between the ninth and tenth contacts 32 and 34 of the intelligent patch panel port 31. The ninth and tenth contacts 32 and 34 of the intelligent patch panel port 31 are arranged to maintain contact with the first and second contact plates 24 and 26, respectively, while the patch panel plug 12 is connected to the intelligent patch panel port 31. The first and second contact plates 24 and 26 are separated by an insulator layer 25.

The operation of the switch plug 14 of the smart patch cord 10 will now be described. As shown in FIG. 1, the smart patch cord 10 includes LEDs and control circuitry 15, identification circuitry 17, and plug detection circuitry 19. The LEDs and control circuitry 15 provide LEDs on the switch plug 14 and also allow for control of the LEDs. The identification circuitry 17 allows each smart patch cord 10 in a network to be uniquely identified. The plug detection circuitry 19 allows for detection of when the smart patch cord 10 is plugged into an Ethernet switch port. In the embodiment of FIG. 1, all these circuits are provided in the switch plug 14, but circuits may be located in other parts of the smart patch cord 10. Specific circuit designs for the LED control circuitry 15, the identification circuitry 17, and the plug detection circuitry 19 will now be shown and described with reference to FIGS. 1a-1e.

Figure 1A:
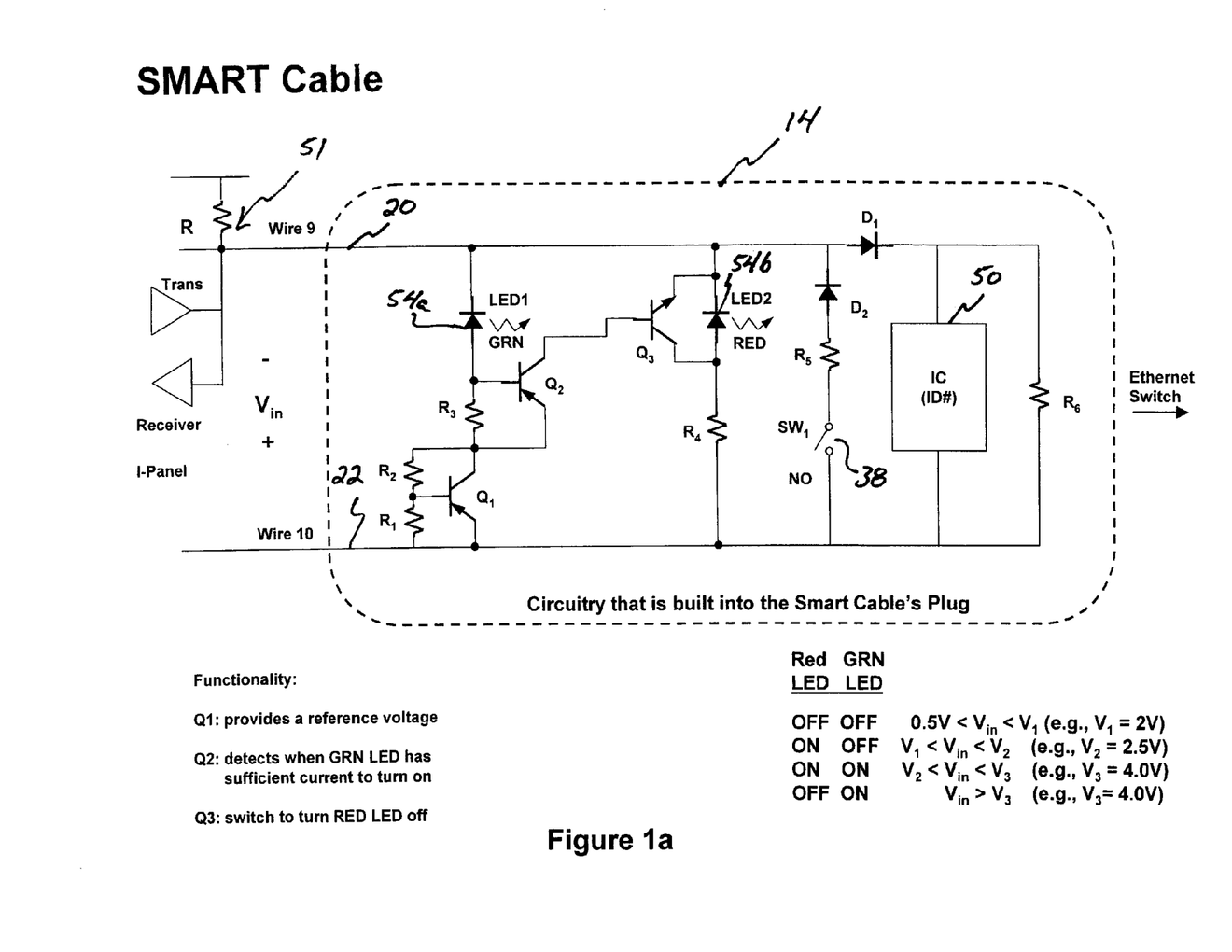
FIG. 1a is a diagram of smart cable circuitry according to one embodiment of the present invention.

The switch plug 14 has a pogo pin 36 that is spring-biased to an outward position as shown in FIG. 4. In the embodiment of FIG. 1a, the pogo pin 34 operates a normally open switch 38 so that when the pogo pin 36 is pushed into the pogo switch assembly 28 upon insertion of the switch plug 14 into a switch port, the normally open switch 38 of the pogo switch assembly 28 is closed. This enables the intelligent patch panel to determine when the switch plug 14 has been plugged into a switch port. In the embodiment of FIG. 1a, the transistors $Q_1$, $Q_2$, and $Q_3$; resistors $R_1$, $R_2$, $R_3$, and $R_4$; and LEDs 54a and 54b provide the functionality of the LEDs and control circuitry 15 as shown in FIG. 1. The ID integrated circuit 50, diode $D_1$, and resistor $R_6$ provide the functionality of the identification circuitry 17 as shown in FIG. 1 by responding to an intelligent patch panel 40 (further shown and described below with reference to FIG. 7) with an ID number when the intelligent patch panel 40 requests to read the ID. The circuitry 51 illustrated on the far left side of FIG. 1a is a representative view of the circuitry of an intelligent patch panel 40.

Figures 1B, 1C:
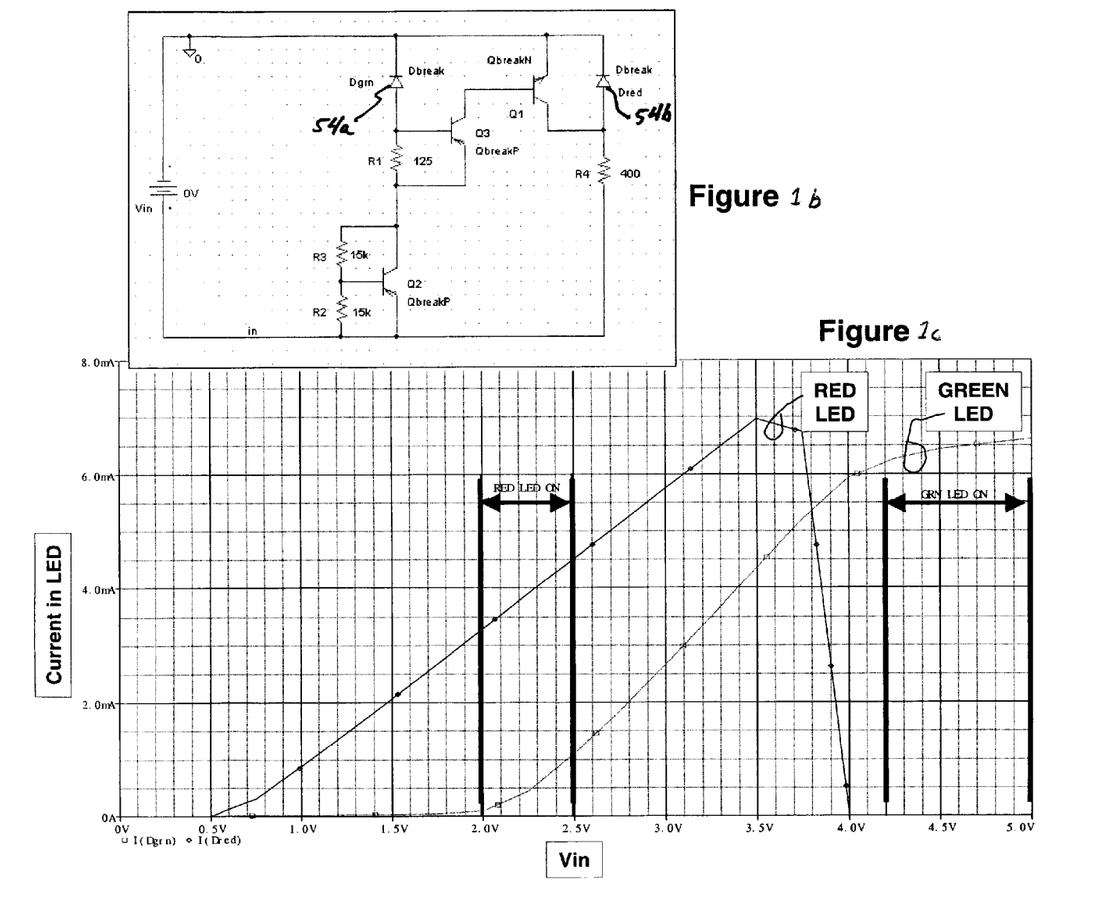
FIG. 1b is a diagram of smart cable circuitry according to one embodiment of the present invention.
FIG. 1c is a current-to-voltage plot of the circuit of FIG. 1b.

It is desired that the LEDs and control circuitry 15 be able to selectively turn the green LED 54a or the red LED 54b on and not interfere with the functionality of the ID integrated circuit 50. The embodiment shown in FIG. 1a satisfies this requirement. FIGS. 1b and 1c provide an example simulation of the LED control circuitry of FIG. 1a. The LEDs 54a and 54b are turned on with a reverse voltage applied to the ninth and tenth wires 20 and 22 of the smart patch cord 10. This reverse voltage is labeled $V_{in}$ in FIGS. 1a and 1b (the reverse voltage circuitry in the intelligent patch panel 40 is not shown). For $V_{in}$ less than $V_1$, both LEDs 54a and 54b are essentially off. Here the input voltage is not high enough to provide enough current into the red LED 54b to make it very bright and the voltage is too low to turn $Q_1$ on to even provide current to the green LED 54a. The transistor $Q_1$ and resistors $R_1$ and $R_2$ implement a common circuit called a Vbe multiplier, which multiplies the base-emitter voltage of a transistor by the ratio of $R_2/R_1$. For input voltages $V_1 < V_i < V_2$, the red LED 54b is on and the green LED 54a still remains off. Here the $V_{in}$ provides enough voltage to produce enough current into the red LED 54b to turn it on brightly. The $V_{in}$ within this range still is not large enough to provide enough current into the green LED 54a. As the input voltage is increased such that $V_2 < V_{in} < V_3$, the red LED 54b is still on and now the green LED 54a begins to turn on. Once $V_{in}$ exceeds $V_3$, the green LED 54a stays on but the red LED 54b turns off because the current through $R_2$ produces a sufficient voltage across it to turn $Q_2$ on, which then turns on $Q_3$. This diverts the current from the red LED 54b into $Q_1$ and thus turns the red LED 54b off. In order to operate this circuit effectively, three voltages (or states) must be defined: a voltage for which both LEDs are off ($V_{off}$), a voltage for when only the red LED 54b is on ($V_{red}$), and a voltage when only the green LED 54a is on ($V_{green}$). An example definition of these voltages is shown below:

0.5 V < $V_{off}$ < 1V both LEDs off
2.0 V < $V_{red}$ < 2.5 V only the red LED 54b is on
$V_{green}$ > 4.25 V only the green LED 54a is on.

The integrated circuit (IC) 50 that provides the identification (ID) number of the smart patch cord 10 at the request of the intelligent patch panel 40 is implemented in FIG. 1a and can have the protocol as shown in FIG. 1d. In FIG. 1d, a forward voltage (e.g., 5 V) is applied to the IC 50, and when the intelligent patch panel 40 requests an ID number from the smart patch cord 50, the intelligent patch panel 40 drives the input low and back high in a defined manner such that the IC 50 recognizes this as an ID number request. The IC 50 responds with a series of high-to-low transitions that represent the ID number. This protocol has been implemented and defined in the industry. One such example is the ONE-WIRE™ protocol developed by the Dallas Semiconductor corporation, and an example of an IC that could be used for IC 50 is the DALLAS SEMICONDUCTOR DS2401 IC. The data sheet for this semiconductor, entitled "DS2401 Silicon Serial Number," Dallas Semiconductor Publication No. 022102, is incorporated herein by reference in its entirety. The diode $D_1$ in the circuitry shown in FIG. 1a is included to prevent damage to the IC 50 and to prevent interference by the ID circuitry 17 with the LEDs and control circuitry 15 and the plug detection circuitry 19. The diode $D_1$ effectively eliminates the IC 50 from the circuit when reverse voltages (to operate the LEDs and control circuitry 15 and the plug detection circuitry 19) are applied. Such a reverse voltage, with wire ten at a higher potential than wire 9, is shown in FIG. 1a. The diode $D_1$ allows the IC 50 to operate when a forward voltage is applied across wires nine and ten, and the LEDs and control circuitry 15 and the plug detection circuitry 19 are effectively removed from the circuit when a forward voltage is applied. The resistor $R_6$ ensures that the diode $D_1$ is sufficiently turned on when a forward voltage is applied.

The switch 38 of FIG. 1a is a normally open switch that allows the intelligent patch panel 40 to detect when the switch plug 14 is inserted into an Ethernet switch port 72. The switch 38 is a "pogo" style switch such that when the switch plug 14 is inserted into the Ethernet jack, the pogo pin 36 (as shown in FIG. 4) is depressed and the switch 38 closes. The intelligent patch panel 40 continuously monitors the smart patch cords connected to it and if it detects that resistor $R_5$ is present in the circuit, the intelligent patch panel 40 will determine that the patch cord is inserted into the Ethernet switch. If the resistor $R_5$ is not detected by the intelligent patch panel 40, the intelligent patch panel 40 will determine that the patch cord is not inserted into an Ethernet switch. The diode $D_2$ allows current to flow through the resistor $R_5$ only when a reverse voltage is applied across wire nine 20 and wire ten 22 (i.e., wire ten 22 is at a higher potential than wire nine 20).

The LEDs and control circuitry 15 cause three different magnitudes of current to flow in wires 20 and 22 corresponding to the three different voltage levels which determine the state of the LEDs. When pogo switch 38 is closed, each of the three different voltage levels which determine the state of the LEDs cause three different currents to flow through the switch 28 and the resistor $R_5$, and these currents also flow through wires 20 and 22.

The intelligent patch panel correlates the reverse voltage applied to wires nine and ten with the total current flowing through them to determine if the switch plug 14 is plugged into a switch port 72. If no current is flowing through wires nine and ten when a reverse voltage is applied, the intelligent patch panel concludes that no smart patch cord is plugged into a patch panel port 31 or 60. A reverse voltage is constantly applied except when a patch cord ID is being read with a forward voltage.

Figure 1E:
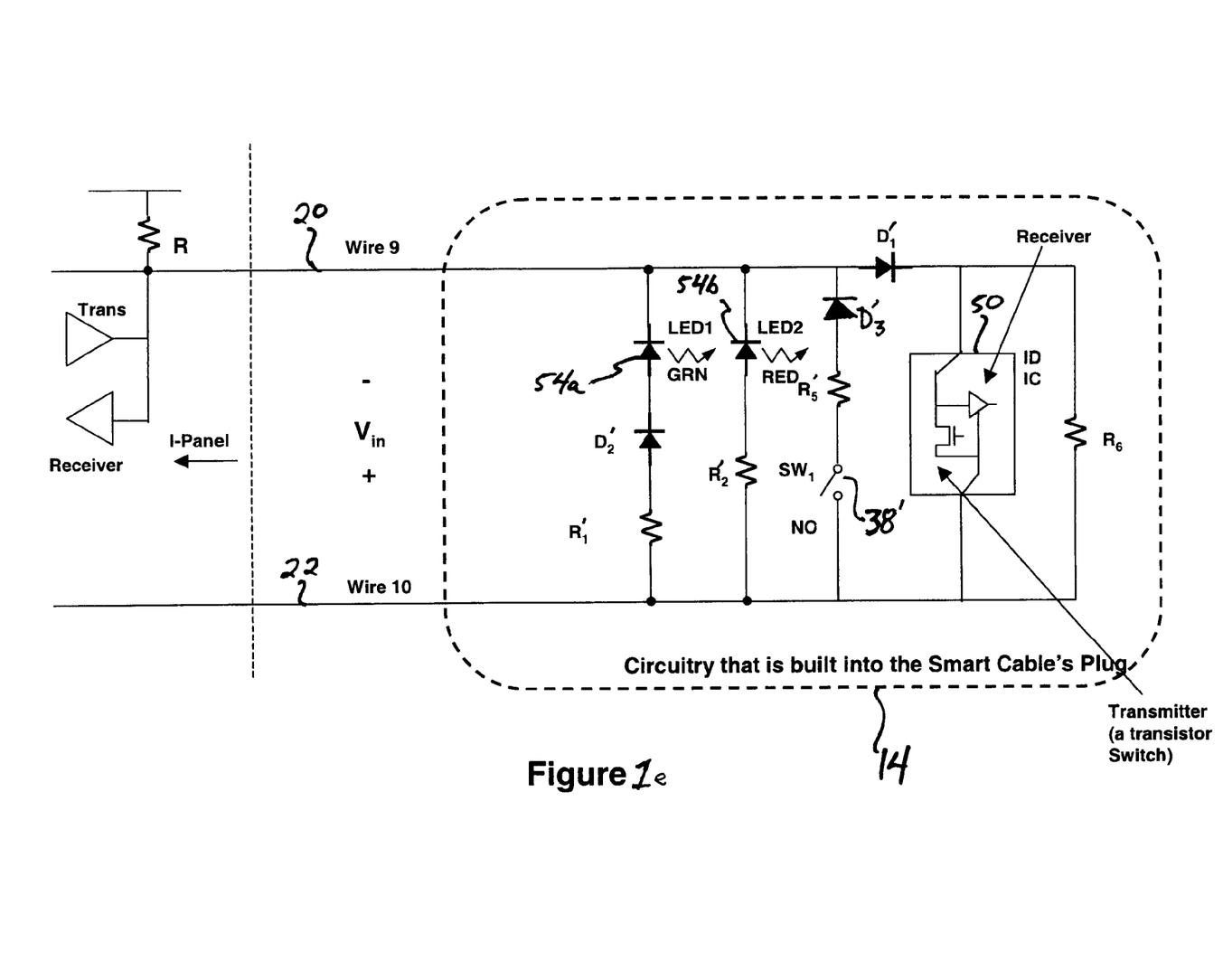
FIG. 1e is a diagram of smart cable circuitry according to one embodiment of the invention.

FIG. 1e shows another embodiment of the circuitry of the smart patch cord 10. In the embodiment of FIG. 1e, the LED control circuitry is slightly different from the circuitry shown in FIG. 1a. The LED control circuitry of FIG. 1e operates in a reverse voltage mode similarly to the circuitry of FIG. 1a, except that the LEDs 54a and 54b are controlled differently. In the embodiment shown in FIG. 1e, at a sufficiently low voltage, both LEDs 54a and 54b will remain off. At a higher input voltage $V_{in}$, the red LED 54b will turn on, but the voltage will be too low for both the diode $D_2$' of FIG. 1e and the green LED 54a to turn on. At a still higher input voltage $V_{in}$, the red LED 54b will remain on and the voltage will be sufficiently large for the green LED 54a to also turn on. When both the green LED 54a and the red LED 54b are on, if one mixes the resulting light, it will appear to the user as amber in color. If one does not mix the resulting light, the fact that both the red LED 54b and the green LED 54a are on can be used to signify an event. Hence, three states will exist for the LEDs in the embodiment of FIG. 1e: (1) both LEDs off, (2) red LED 54b on; and (3) both LEDs on. In the embodiment of FIG. 1e, the switch 38', which allows the intelligent patch panel 40 to detect when the switch plug 14 is plugged into a switch port, is a normally open switch.

Figure 5:
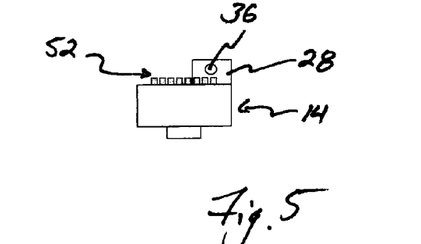
FIG. 5 is a front view of the plug of FIG. 4.
Figure 6:
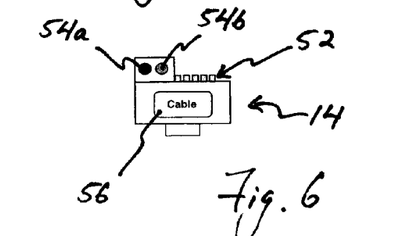
FIG. 6 is a rear view of the plug of FIG. 4.

The physical aspects of the switch plug 14 are further shown in FIGS. 4, 5, and 6. FIG. 4 is a perspective view of an unplugged switch plug 14, with the pogo pin 36 in its extended position. FIGS. 5 and 6 show front and rear views, respectively, of the switch plug 14. First through eighth contacts 52 of the switch plug 14 correspond to first through eighth wires of the smart patch cord. As shown in FIG. 6 and as further described below, light-emitting diodes (LEDs) 54a and 54b are provided on the switch plug 14 and are visible from the rear. According to one embodiment, the LEDs of the switch plug 14 are a green LED 54a and a red LED 54b. The first through eighth wires 16, the ninth wire 20, and the tenth wire 22 of the smart patch cord may be provided as a five-pair cable 56 that is terminated at the switch plug 14.

Figure 7:
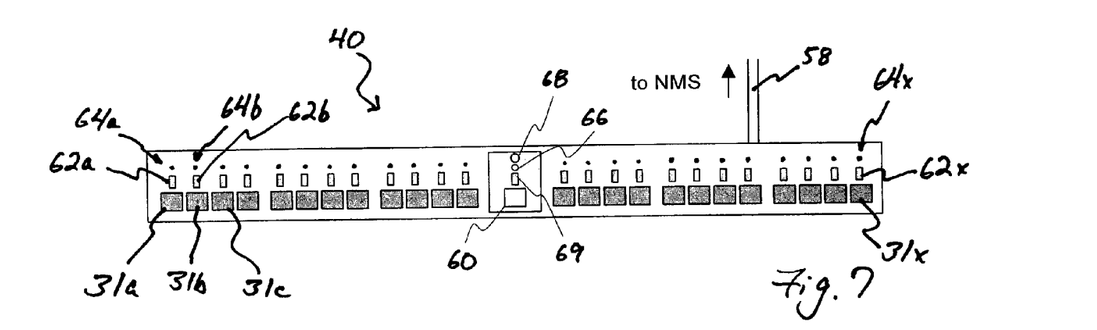
FIG. 7 is a front view of an intelligent patch panel according to one embodiment of the present invention.

FIG. 7 is a front view of an intelligent patch panel 40 for use with the smart patch cord 10. The intelligent patch panel 40 illustrated in FIG. 7 has 24 signal ports 31a-31x on its front face. A network management system (NMS) Ethernet connection 58 connects to a management port of the intelligent patch panel 40 and allows the intelligent patch panel 40 to communicate with a network management system. A provisioning port 60 is also provided on the face of the intelligent patch panel 40. Each of the signal ports 31a-31x has an associated smart cord contact assembly 62, comprising the ninth and tenth contacts 32 and 34 associated with each of the ports 31a-31x. Each signal port 31a-31x also has an associated LED 64a-64x. The provisioning port 60 has an LED 66, an associated push button switch 68, and a smart cord contact assembly 69.

The push button switch 68 is used to provide information to the user as to where patch cords are connected. This can be done by lighting LEDs that represent the two connecting ends of patch cords for cross-connect and interconnect applications. According to one embodiment, when the user pushes the push button switch 68 once, the LED 64a associated with the first signal port 31a will light, and so will an LED (for example, LED 54a or 54b) in the switch plug 14 of the smart patch cord 10 that is plugged into the first signal port 31a. When the user pushes the push button switch 68 a second time, the LED 64b associated with the second signal port 31b will light, and so will an LED in the switch plug 14 of the smart patch cord that is plugged into the second signal port 31b. Likewise, in cross-connect applications, LEDs associated with both ends of each patch cord can be lighted in this manner. The user may terminate this process, for example, by pushing the push button switch 68 twice rapidly or by holding down the push button switch 68.

Figure 8:
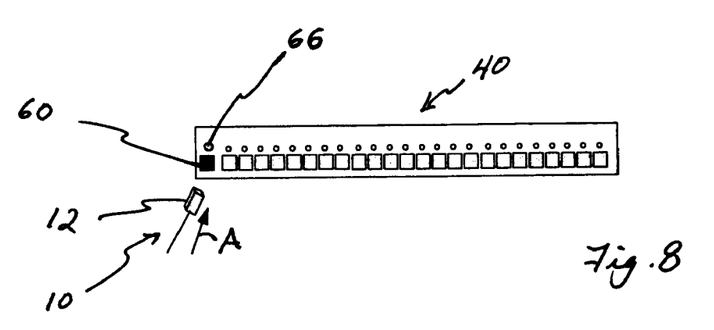
FIG. 8 is a front view of an intelligent patch panel according to one embodiment of the present invention with a smart patch cord being plugged into a provisioning port during a patch cord addition.
Figure 10:
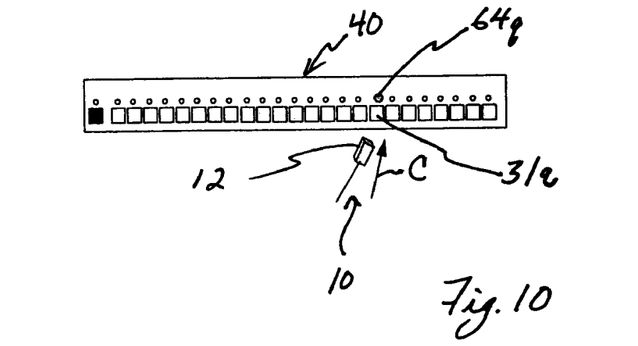
FIG. 10 is a front view of an intelligent patch panel with a smart patch cord being plugged into signal port during a patch cord addition.
Figure 12:
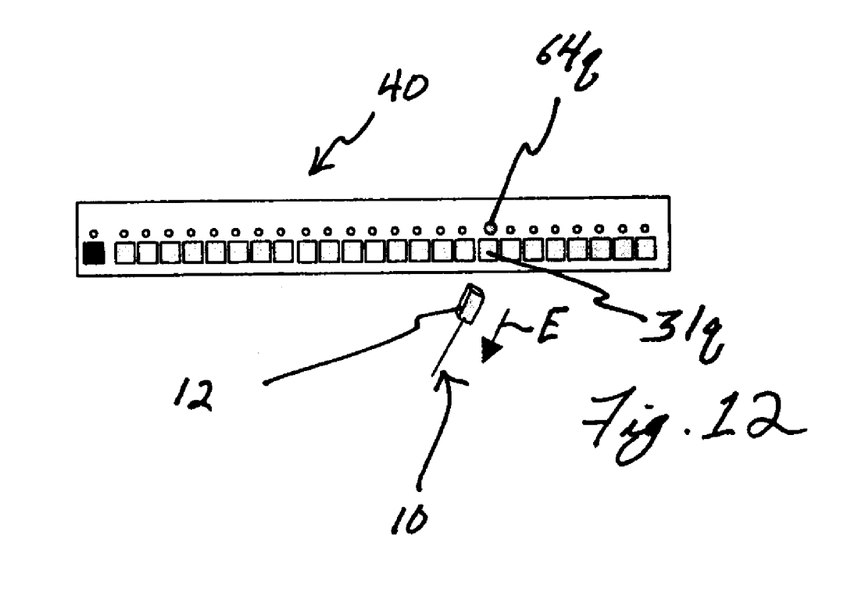
FIG. 12 is a front view of an intelligent patch panel with a smart patch cord being unplugged during a patch cord removal.

The provisioning port 60 is preferably located near the center of the face of the intelligent patch panel 40 to reduce problems with patch cord lengths, though an alternative end location is shown in FIGS. 8, 10, and 12. The intelligent patch panel 40 may have a separate power connection (not shown), or it may receive power via power-over-Ethernet through the NMS connection 58. The intelligent patch panel 40 includes processing circuitry, communication circuitry, and memory that enable it to perform the functions described below.

Figure 9:
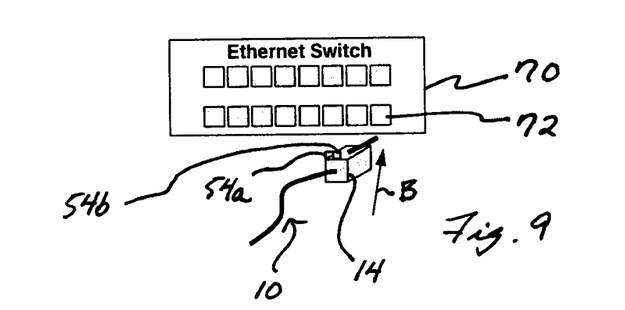
FIG. 9 is a front view of an Ethernet switch with a smart patch cord being plugged into a switch port during a patch cord addition.

FIGS. 8-10 illustrate how the intelligent patch panel 40 works in conjunction with a smart patch cord 10 to guide an installer in the addition of a patch cord to a network. The intelligent patch panel 40 is located near an Ethernet switch 70 in an interconnect network, preferably in a data closet. In order to guide the addition of a patch cord connection between the intelligent patch panel 40 and the Ethernet switch 70, first a work order to add a new patch cord is issued. The locations of the ports to which to connect the new patch cord may be displayed on a display in the data closet. In addition, LEDs of the switch plug 14 and of the ports of the intelligent patch panel 40 signal operations to be performed by the installer. These LED signals are as follows:

On: Add a plug
Flashing; Remove a plug
Green: Normal Operation
Red: An error has been made.

To begin the addition of a patch cord to the network, the installer plugs the patch panel plug 12 of the smart patch cord 10 into the provisioning port 60 of the intelligent patch panel 40, as shown by the arrow "A" of FIG. 8. The provisioning port 60 will have its associated LED 66 lit in solid green to guide the installer. After the patch panel plug 12 has been inserted into the provisioning port 60, the green LED 66 of the provisioning port turns off and the intelligent patch panel 40 reads the identification number of the identification circuit 50 (as shown in FIG. 1) through the ninth and tenth wires of the smart patch cord 10. The intelligent patch panel 40 also sends a signal through the smart patch cord 10 to light the green LED 54a on the switch plug 14 (as shown in FIG. 9). The installer then plugs the switch plug 14 into the appropriate port 72 of the Ethernet switch 70, as shown by the arrow "B" of FIG. 9. This initiates the intelligent patch panel provisioning operation.

When a patch cord connected to the provisioning port 60 is connected to a switch port, the intelligent patch panel 40 sends a message which includes the patch cord ID number to the NMS through the patch cord and the switch port. The NMS then determines which switch and switch port this message was received on by reading the routing tables in the Ethernet switch. Prior to sending the message that includes the ID number, the intelligent patch panel may send an Ethernet Link-Up message to the NMS that the network management system will interpret as the addition of a new patch cord, and the NMS may send a Simple Network Management Protocol (SNMP) message to the intelligent patch panel requesting the ID number of the new smart patch cord. If the switch plug 14 is plugged into the correct port 72 of the Ethernet switch 70, the green LED 54a turns off. If the switch plug 14 is plugged into the wrong switch port, the red LED 54b will flash.

If the intelligent patch panel provisioning operation is successful, the provisioning port LED 66 will flash green until the patch panel plug 12 is removed from the provisioning port 60. If the operation fails, the provisioning port LED 66 will flash red and the installer should retry the operation. If the operation fails after the retry, the smart patch cord 10 can be programmed manually.

After the patch panel plug 12 is removed from the provisioning port 60 following a successful provisioning operation, an LED associated with the intelligent patch panel signal port into which the patch panel plug 12 is to be inserted will turn on solid green or will flash green. In the example shown in FIG. 10, the patch panel plug 12 is to be plugged into the seventeenth signal port 31q of the intelligent patch panel 40, and the seventeenth patch panel port LED 64q turns on solid green to indicate the designated port to the installer. The installer plugs the patch panel plug 12 into the designated port, as shown by the arrow "C" of FIG. 10. If the addition of the smart patch cord 10 is successful, the LED 64q will turn off. If the patch cord 10 is plugged into the wrong port, the wrong port's associated LED will flash red and the installer must take the patch cord out of the wrong intelligent patch panel signal port and locate the designated signal port adjacent to the activated green LED 64q. When a patch cord is plugged into any signal port, the intelligent patch panel will read the ID number of the patch cord to ensure it is the correct patch cord. If it is not the correct patch cord, the LED 64 of that port will flash red and the patch cord plug must be removed from that port.

Figure 11:
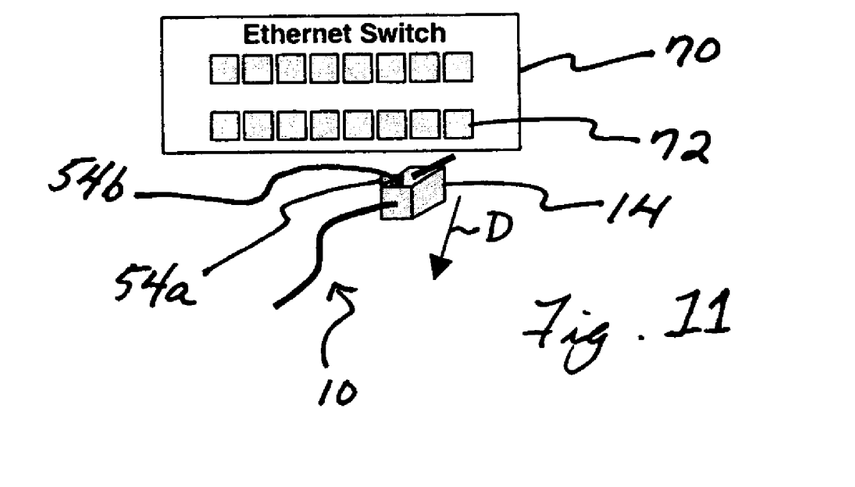
FIG. 11 is a front view of an Ethernet switch with a smart patch cord being unplugged during a patch cord removal

FIGS. 11 and 12 illustrate the process of removing a smart patch cord 10 that is connected between an intelligent patch panel 40 and an Ethernet switch 70, preferably within a data closet. First, a work order to remove a patch cord is issued. The locations of the ports from which to disconnect the patch cord are displayed on a display in the data closet. The installer is guided to the Ethernet switch side of the smart patch cord 10 first by an LED 54a on the switch plug 14. The LED 54a may flash green to indicate to the installer that the switch plug 14 is to be removed. The installer then removes the switch plug 14 from the Ethernet switch port 72, as shown by the arrow "D" of FIG. 11. Upon successful removal of the switch plug 14 from the correct switch port 72, the LED 54a turns off. If the LED 54b turns red following removal of the switch plug, that indicates that the switch plug was removed from the wrong port. If this occurs, that patch cord must be removed from the intelligent patch panel 40 and the patch cord addition procedure must be followed. When the patch cord has been correctly removed from the Ethernet switch 70, the intelligent patch panel 40 sends a message to the NMS indicating which patch cord was removed. Once the smart patch cord 10 is removed from the Ethernet switch 70, an NMS database disassociates the identification number of the smart patch cord from the Ethernet switch port to which it had been connected.

To continue the removal process for the smart patch cord 10, as shown in FIG. 12, the installer is guided to the intelligent patch panel 40 by the intelligent patch panel port LED 64q that is associated with the port from which the smart patch cord 10 is to be removed. The LED 64q flashes green to indicate the designated signal port. The installer then removes the patch panel plug 12 from the patch panel designated signal port 31q, as shown by the arrow "E" of FIG. 12. If the patch panel plug 12 was removed correctly, the LED 64q will turn off, indicating success. If the LED 64 turns red upon removal of the patch panel plug 12, this indicates that the incorrect patch panel plug was removed and the installer should reinsert the removed plug and remove the designated plug as indicated by a flashing green LED 64q. If any patch cord addition or removal function which has started has not been successfully completed, no additional such functions will be ordered until the problem has been resolved.

Figure 13:
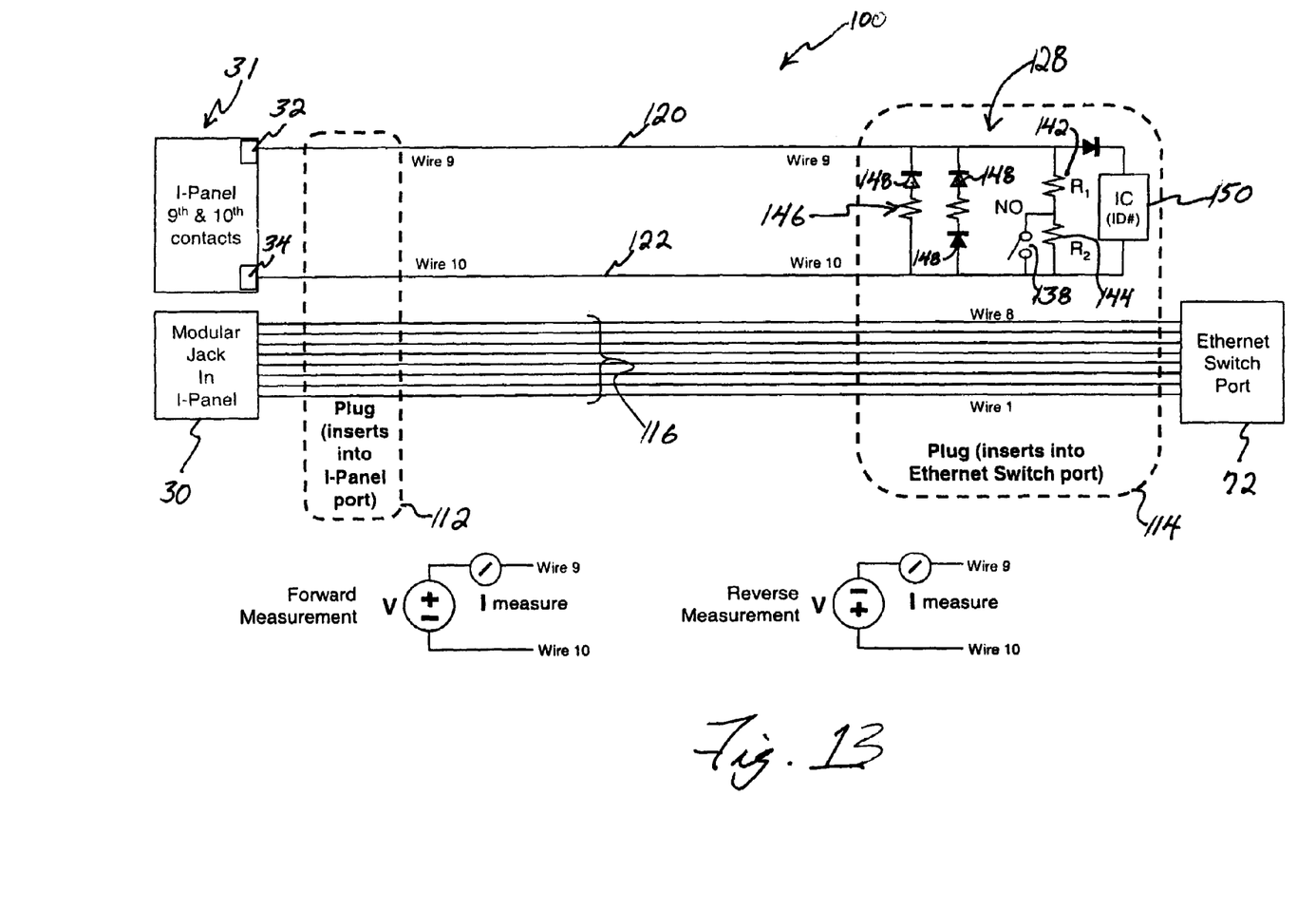
FIG. 13 is a block diagram of a smart patch cord according to one embodiment of the present invention.

FIG. 13 is a block diagram showing a smart patch cord 100 according to another embodiment of the invention. The smart patch cord 100 operates in a manner similar to that described above, thus the indicator lights are not shown. An intelligent patch panel can detect whether the switch plug 114 of the smart patch cord 100 is plugged into a switch port by performing resistance measurements on the ninth and tenth wires 120 and 122 of the smart patch cord 100 without interfering with signal wires 116. The pogo switch assembly 128 will result in different resistance measurements reflecting the plugged or unplugged status of the switch plug 114. The intelligent patch panel initiates status detection for a smart patch cord 100 by placing a voltage across the ninth and tenth contacts 32 and 34 associated with the intelligent patch panel port 31. The intelligent patch panel then makes resistance measurements across the ninth and tenth contacts 32 and 34. If a very high resistance is measured across the ninth and tenth contacts 32 and 34, the condition is determined to be an open circuit between the ninth and tenth contacts 32 and 34 and the intelligent patch panel determines that no smart patch cord is plugged into the associated port of the intelligent patch panel.

To detect the plugged or unplugged status of the switch plug 114 of a smart patch cord 100 that is plugged into the port 31 of the intelligent patch panel, the intelligent patch panel places forward and reverse voltages on the ninth and tenth wires 120 and 122 to perform forward and reverse resistance measurements. In the forward measurement, a voltage is placed across the ninth and tenth wires 120 and 122 so that the ninth wire 120 has the higher potential. In the reverse measurement, a voltage is placed across the ninth and tenth wires 120 and 122 so that the tenth wire 122 has the higher potential.

If the switch plug 114 of the smart patch cord 100 is unplugged, the normally open switch 138 will be open. Thus, in the forward measurement (with the ninth wire 120 being at a higher potential than the tenth wire 122), a high resistance will result across the ninth and tenth contacts 32 and 34 of the port 31 because current will flow through both the first and second plug presence detection resistors 142 and 144, which are connected in series. The measured resistance in the forward measurement will be $R=R_1+R_2$. In the reverse measurement (with the tenth wire 122 being at a higher potential than the ninth wire 120), a low resistance will be measured across the ninth and tenth contacts 32 and 34 of the port 31 because current will flow through the reverse detection resistors 146 (which are connected in parallel with the series connection between the first and second plug detection resistors 142 and 144) in addition to the first and second plug presence resistors 142 and 144. Diodes 148 ensure that current will flow through the reverse detection resistors 146 in parallel with the series connection between the first and second plug resistors 142 and 144 only during the reverse measurement process and not during the forward measurement process.

If the switch plug 114 of the smart patch cord 100 is plugged into a network switch, the normally open switch 138 will be closed. Thus, in the forward measurement, a lower resistance will result across the ninth and tenth contacts 32 and 34 of the port 31 because current will flow only through the first plug presence detection resistor 142, with the closed switch 138 effectively shunting the second plug presence detection resistor 144 out of the circuit. The measured resistance in the forward measurement will be $R=R_1$. In the reverse measurement, with the normally open switch 138 being closed, again a lower resistance will be measured because current will also flow through the reverse detection resistors 146, which are connected to the circuit in parallel. The identification circuit 150 is also included in the pogo switch assembly 128. Similar to the embodiment shown in FIG. 1e, the detection circuitry contains only passive elements.

The principles of the present invention may be applied to other specific systems. For example, patch cords according to other embodiments of the present invention are designed for use in optical communication networks or in other electrical communication networks that do not employ RJ-45 plugs and jacks. The present invention may also be applied in a cross-connect application.

It will be appreciated that various of the above-disclosed and other features and functions, or alternatives thereof, may be desirably combined into many other different systems or applications. For example, "a" may denote the use of one or more elements. The lists presented herein are intended to be exemplary rather than limiting. Also, variations presently unforeseen or unanticipated alternatives, modifications, variations or improvements therein may be subsequently made by those skilled in the art, and are also intended to be encompassed by the following claims.

What is claimed is:

1. A patch cord comprising:
   a plurality of signal wires;
   two control wires;
   a first connector adapted to connect the signal and control wires with a first communication device, said first connector comprising a plug that terminates the signal wires and two parallel contact plates extended in a mating direction and separated by an insulator layer, said plates terminate said two control wires; the contact plates and plug configured to connect with different connectors of the first communication device; and
   a second connector adapted to connect only the signal wires of the signal and control wires with a second communication device,
   wherein the second connector includes:
      an indicator light,
      control circuitry configured to control the indicator light,
      a pogo switch assembly wherein the pogo switch assembly changes states when a pogo pin is pushed into the pogo switch assembly;
      detection circuitry configured to detect whether the second connector is plugged into the second communication device via the pogo switch assembly changing states, and
      identification (ID) circuitry configured to provide a unique ID number of the patch cord to the first communication device through the first connector,
   wherein the control circuitry, the indicator light, the detection circuitry, and the ID circuitry are connected to the at least one control wire but not to the signal wires.

2. The patch cord of claim 1 wherein the second connector comprises a plurality of different color indicator lights.

3. The patch cord of claim 2 wherein the control circuitry comprises a first switch configured to deactivate a first indicator light, a second switch configured to detect when a second indicator light of a different color than the first indicator light has sufficient voltage to turn on and the second switch configured to activate the first switch in response thereto, and a third switch configured to increase a current through the first indicator light and turn on the first indicator light.

4. The patch cord of claim 2 wherein the control circuitry comprises only passive components connected to the indicator lights, the passive components configured such that the indicator lights turn on when different voltages are applied to the at least one control wire.

5. The patch cord of claim 2 wherein the detection circuitry is configured to detect the connection between the second connector and the second communication device and the control circuitry is configured to selectively turn on and off the indicator lights without interfering with the functionality of the ID circuitry.

6. The patch cord of claim 5 wherein the at least one control wire comprises a plurality of control wires, and the indicator lights and the ID circuitry are configured to be alternatively activated by opposite polarity voltages applied to the control wires.

7. The patch cord of claim 6 wherein the control circuitry is configured to cause a plurality of different magnitudes of current to flow between the control wires corresponding to a plurality of different voltage levels that determine a state of each of the indicator lights.

8. The patch cord of claim 5 wherein the second connector further comprises a plurality of diodes configured to protect the detection circuitry and the control circuitry when the ID circuitry is active and configured to protect the ID circuitry when either of the detection circuitry or the control circuitry is active.

9. A patch cord comprising:
a plurality of signal wires;
a plurality of control wires;
a first connector including a plug that terminates the signal wires and two parallel contact plates extended in a mating direction and separated by an insulator layer, said plates terminate the control wires, the contact plates and plug configured to connect with different connectors of a first communication device;
a second connector adapted to connect only the signal wires of the signal and control wires with a second communication device; and
a plurality of different color indicator lights,
wherein the second connector contains circuitry connected between the control wires, the circuitry including:
control circuitry configured to control the indicator lights,
a pogo switch assembly wherein the pogo switch assembly changes states when a pogo pin is pushed into the pogo switch assembly;
detection circuitry configured to detect whether the second connector is plugged into the second communication device via the pogo switch assembly changing states,
identification (ID) circuitry configured to provide a unique ID number of the patch cord to the first communication device through the first connector, and
protection circuitry configured to protect the detection circuitry and the control circuitry when the ID circuitry is active and configured to protect the ID circuitry when either of the detection circuitry or the control circuitry is active.

10. The patch cord of claim 9 wherein the control circuitry comprises a first control switch configured to deactivate a first indicator light, a second control switch configured to detect when a second indicator light of a different color than the first indicator light has sufficient voltage to turn on and the second control switch configured to activate the first control switch in response thereto, and a third control switch configured to increase a current through the first indicator light and turn on the first indicator light.

11. The patch cord of claim 9 wherein the control circuitry comprises only passive components connected to the indicator lights, the passive components configured such that the indicator lights turn on when different voltages are applied to the control wires.

12. The patch cord of claim 9 wherein the detection circuitry is configured to detect the connection between the second connector and the second communication device and the control circuitry is configured to selectively turn on and off the indicator lights without interfering with the functionality of the ID circuitry.

13. The patch cord of claim 12 wherein the indicator lights and the ID circuitry are configured to be alternatively activated by opposite polarity voltages applied to the control wires.

14. A communication system comprising:
a first communication device having a provisioning port and a signal port, and a contact assembly and an indicator associated with each of the provisioning and signal ports;
a second communication device having a switch port without a corresponding contact assembly;
a network management system connected to at least one of said first communication device and said second communication device; and
a patch cord comprising:
a plurality of signal wires;
at least one control wire;
a first connector adapted to connect the signal wires into one of the provisioning and signal ports and the control wire to the corresponding contact assembly; and
a second connector adapted to connect the signal wires into the switch port and terminate the at least one control wire without providing a connection to the second communication device,
wherein the second connector includes:
an indicator light,
control circuitry configured to control the indicator light,
a pogo switch assembly wherein the pogo switch assembly changes states when a pogo pin is pushed into the pogo switch assembly;
detection circuitry configured to detect whether the second connector is plugged into the second communication device via the pogo switch assembly changing states, and
identification (ID) circuitry configured to provide a unique ID number of the patch cord to the first communication device through the first connector,
wherein the control circuitry, the indicator light, the detection circuitry, and the ID circuitry are connected to the at least one control wire but not to the signal wires, and further wherein the first communication device is configured to read the ID number and to transmit a message that includes the ID number to the network management system when the patch cord is connected to the provisioning port, wherein the first connector comprises a plug that terminates the signal wires and two parallel contact plates extended in a mating direction and separated by an insulator layer, said plates terminate said two control wires, the plug and contact plates configured to connect with the signal port and the corresponding contact assembly, respectively, of the first communication device.

15. The communication system of claim 14 wherein the provisioning port and corresponding contact assembly are located near a center of a face of the first communication device.

16. The communication system of claim 14 wherein the at least one control wire comprises a plurality of control wires, and the indicator light and the ID circuitry are configured to be alternatively activated by opposite polarity voltages applied to the control wires.

17. The communication system of claim 16 wherein the first communication device is configured to correlate a voltage applied to the control wires with a total current flowing through the control wires to determine if the second connector is plugged into the switch port.

18. The communication system of claim 16 wherein the first communication device is configured to constantly apply a reverse voltage to the control wires except when the ID number is to be read.

* * * * *